(154.)

WILLIAM F. COLLIER.

Corn Popper.

No. 4,703. Reissued Jan. 9, 1872.

Witnesses

Chas. Burleigh

J. S. Siddings

Inventor

Wm F. Collier

AM. PHOTO-LITHOGRAPHIC CO. N.Y. (OSBORNE'S PROCESS.)

UNITED STATES PATENT OFFICE.

WILLIAM F. COLLIER, OF WORCESTER, MASSACHUSETTS, ASSIGNOR TO HOWE, BIGELOW & CO.

IMPROVEMENT IN CORN-POPPERS.

Specification forming part of Letters Patent No. 111,319, dated January 31, 1871; reissue No. 4,703, dated January 9, 1872.

*To all whom it may concern:*

Be it known that I, WILLIAM F. COLLIER, of the city and county of Worcester and Commonwealth of Massachusetts, have invented certain new and useful Improvements in Corn-Poppers; and I do hereby declare the following to be a full, clear, and exact description of the same, reference being had to the accompanying drawing which forms a part of this specification, and in which—

Figure 1:
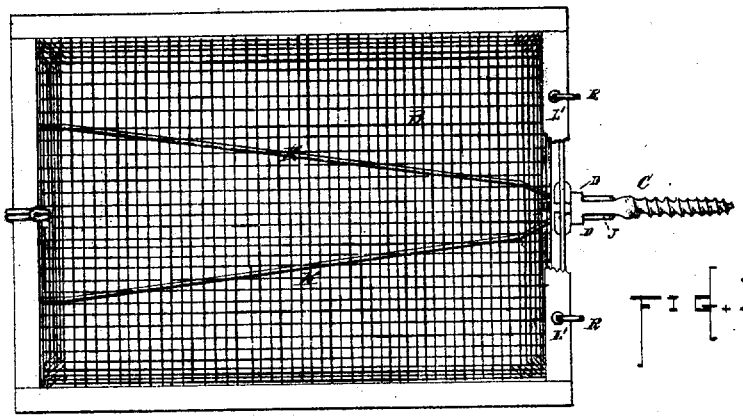
Figure 2:
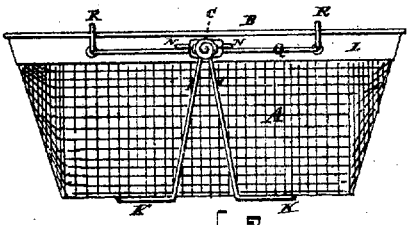
Figure 3:
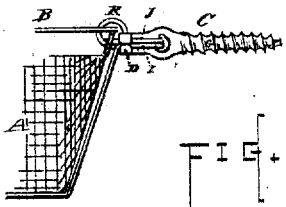
Figure 4:
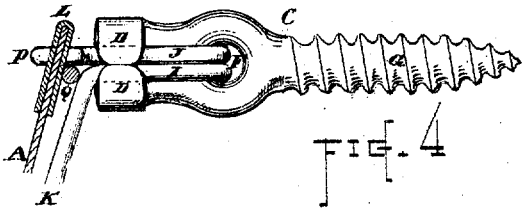
Figure 5:
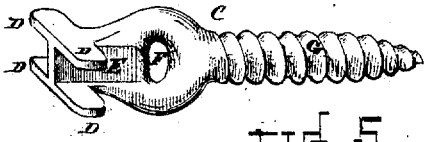

Figure 1 represents a plan view of my improved corn-popper, a portion of the cover being shown broken away to show the parts beneath. Fig. 2 represents a rear view of my improved corn-popper. Fig. 3 represents a side view of the handle, connecting device, and a portion of the popper-box. Fig. 4 represents a side view of the connecting device drawn to an enlarged scale, and Fig 5 represents a perspective view of the handle-connecting device before attaching it to the other parts of the popper.

To enable others skilled in the art to which my invention belongs to make and use the same, I will proceed to describe it more in detail.

The nature of my invention consists: First, in a screw-shank attachment for connecting the handle to the popper-box, and also for supporting the rear part of the bottom guard-wire. Second, in a screw-shank attachment, the front part of which is so constructed as to receive and give proper support to the rear part of the bottom guard-wire or wires, on a line or nearly so with the axis of the screw-shank, and also on a line or nearly so with the connection which clamps the shank attachment to the popper-box. Third, in the combination of the handle-connecting device, bottom guard-wire or wires, and independent wire which forms the hinges of the cover with the popper-box, whereby, when the handle connection is secured to the popper-box, the rear part of the guard-wire or wires will be forced against the central portion of the separate and independent wire which forms the hinges, thereby pressing the latter wire firmly against the rear part of the popper-box, as and for the purpose herein stated. Fourth, in the combination, with the rear upper part of the popper-box, binding-plate, and the rear part of the bottom guard-wire or wires, of a screw-shank or handle connection.

In the drawing, the part marked A represents the popper-box. B indicates the cover, and C the screw-shank or handle connection. The screw-shank C is made of malleable iron or other suitable metal. It is cast, in this instance, with laterally-projecting ear-pieces D D at the upper and under sides of the flat vertical center piece E at its front end, as shown in Fig. 5. At a short distance back from the ear-pieces D an opening, F, is formed through the central portion of the shank, beyond which the shank is rounded off and provided with a screw-thread, G, by means of which it is secured to the wooden handle, which handle is not shown in the drawing, as it may be constructed in any desired form. The screw-shank attachment is, in this instance, joined to the popper-box in the following manner: Two strands or pieces of wire, I and J, are passed through the opening F, and their ends bend around to the front parallel with the center piece E, against which they are firmly secured by clinching or bending down upon them the ear-pieces D. The ends of the wire I are then bent downward at the end of the shank, and diverging pass down under and across the bottom of the popper-box A to form bottom guards K, the extremities or ends of said wires being turned up and hooked into holes formed in the binding L at the front edge of the popper-box where they are securely clinched. The ends of the wire J are bent to the right and left at the end of the shank, and are passed through holes formed in the binding L at the rear upper edge of the popper-box, as shown at N, after which the ends are clinched down upon the inner side of the binding, as indicated at P. The cover B is attached to the popper-box A by means of a separate or independent piece of wire, Q, the ends of which are passed through holes in the bindings L and L′, and bent so as to form ring hinges R. The central part of the wire Q is held between the rear part of the guard-wires I, rear part of the popper-box, and the prongs of the wire J, which secure the rear part of the screw-shank attachment to the rear part of the popper-box. The front part of the screw-shank attachment is so made as to receive and give proper support to the rear part of the bottom guard-wire or wires on a line or nearly so with the axis of the screw-shank, and also on a line or nearly so with the connection which clamps the shank attachment to the popper-box, thus forming a neat, compact, and durable connection.

It will be seen that a very secure and stiff connection is obtained between the rear part of the popper-box and handle. It will also be observed that the rear part of the bottom guard-wires, which pass under the popper-box, receive their entire support from the forward parts of the screw-shank attachment, and are retained in proper position by bending or setting a portion of the metal of the screw-shank attachment firmly down upon the wires. It will also be observed that, when the projecting ends of the clamping-wire J are clinched down upon the inner upper edge of the popper-box, that the guard-wires are forced against the central part of the hinge-wire Q, thereby pressing the latter against the rear part of the popper-box in such a manner as to cause its hinged ends R R to spring back, thus securing more perfect action to the hinge by which the cover is joined to the popper-box.

It will be seen from the foregoing description that, when the popper-box is used, that the rear part of the guard-wires is held by their clamp connection with the forward part of the screw-shank attachment in such a manner as to form, in a measure, a spring support for the bottom of the popper-box, inasmuch as the tendency is to bend the rear end of the guard-wire I at the point where it is turned down at the forward end of the screw-shank attachment.

The front end of the shank C may be made in a different manner from that shown in the drawing, provided it is so made that it can be securely attached to the popper-box.

Having described my improvements in corn-poppers, what I claim therein as new and of my invention, and desire to secure by Letters Patent, is—

1. A screw-shank attachment for forming the connection between the handle and the popper-box so constructed as to also receive, retain, and give proper support to the rear part of the wire or wires which form the bottom guards of the popper.

2. A screw-shank attachment for forming the connection between the handle and the popper-box so constructed as to receive and give proper support to the rear part of the bottom guard-wire or wires on a line or nearly so with the axis of the screw-shank, and also in a line or nearly so with the connection which clamps the shank attachment to the popper-box.

3. The combination of the handle-connecting device, bottom guard-wire or wires, and independent wire which forms the hinges of the cover with the popper-box in such a manner that, when the handle connection is secured to the popper-box, the rear part of the guard-wire or wires will be forced against the central portion of the separate and independent wire which forms the hinges, for the purposes stated.

4. The combination, with the rear upper part of the popper-box, of a screw-shank attachment or handle-connecting piece, the forward part of which is provided with a hole or opening to receive and support the rear part of the bottom guard-wire or wires.

5. The combination, with the rear part of the popper-box, of a screw-shank attachment or handle-connecting piece, the rear part of which is provided with a hole or opening to receive the rear part of the bottom guard-wire or wires and with a yielding part or parts to be set or pressed down upon said wire or wires for holding the same in place or position.

6. The combination, with the rear part of the popper-box and its cover, of the independent hinge-wire and rear part of the bottom guard-wires, substantially as and for the purpose set forth.

7. The combination, with the rear upper part of the popper-box, binding-plate, and rear part of the guard-wire or wires I K, of a screw-shank or handle connection C D E F G, substantially as shown and described.

8. The peculiarly-constructed screw-shank attachment C D E G, substantially as shown and described.

9. The combination of the screw-shank attachment C D E G and clamping-wire J with the popper-box and guard-wires I, substantially as and for the purpose set forth.

WM. F. COLLIER.

Witnesses:

CHAS. H. BURLEIGH,
J. S. GIDDINGS.

(154)